United States Patent [19]

Vincent et al.

[11] 4,264,716

[45] Apr. 28, 1981

[54] PHOTOGRAPHIC COLOR DEVELOPER COMPOSITIONS

[75] Inventors: Sheridan E. Vincent; Michael D. Purol, both of Rochester, N.Y.

[73] Assignee: Eastman Kodak Company, Rochester, N.Y.

[21] Appl. No.: 73,770

[22] Filed: Sep. 10, 1979

[51] Int. Cl.³ ........................ G03C 5/30; G03C 7/16; C02F 5/10; C11D 17/00

[52] U.S. Cl. .................................. 430/380; 430/357; 430/376; 430/442; 430/467; 430/484; 430/490; 430/491; 252/174.16; 252/180; 252/DIG. 11

[58] Field of Search ............... 430/467, 490, 491, 468, 430/372, 357, 380, 376, 442, 484; 252/174.16, 180, DIG. 11

[56] References Cited

U.S. PATENT DOCUMENTS

| | | | |
|---|---|---|---|
| Re. 30,064 | 8/1979 | Shimamura et al. | 430/490 |
| 2,875,049 | 2/1959 | Kridel | 96/66 |
| 3,201,246 | 8/1965 | Allen et al. | 96/61 |
| 3,462,269 | 8/1969 | Tassone | 96/55 |
| 3,746,544 | 7/1973 | Heilmann | 430/467 |
| 3,994,730 | 11/1976 | Frank | 430/490 |
| 4,083,723 | 4/1978 | Shimamura et al. | 96/66.5 |
| 4,142,895 | 3/1979 | Frank et al. | 430/490 |

OTHER PUBLICATIONS

Research Disclosure, vol. 134, Item 13410, Jun. 1975.
Research Disclosure, vol. 135, Item 13524, Jul. 1975.
Research Disclosure, vol. 170, Item 17048, Jun. 1978.

*Primary Examiner*—Mary F. Downey
*Attorney, Agent, or Firm*—A. P. Lorenzo

[57] ABSTRACT

Photographic color developer compositions containing a primary aromatic amino color developing agent and an hydroxylamine are stabilized by incorporating therein a combination of sequestering agents, one of which is an aminopolyphosphonic acid compound and another of which is an aromatic polyhydroxy compound. Decomposition of the hydroxylamine, in the presence of heavy metals such as iron which act to catalyze the decomposition, and resultant formation of ammonia is effectively prevented by the presence in the developer composition of this combination of sequestering agents. Undesirable precipitate formation is also effectively avoided.

30 Claims, No Drawings

PHOTOGRAPHIC COLOR DEVELOPER COMPOSITIONS

BACKGROUND OF THE INVENTION

1. Field of the Invention

This invention relates in general to color photography and in particular to new and improved color developing compositions and processes for forming photographic color images. More specifically, this invention relates to color development with a color developing composition, containing a primary aromatic amino color developing agent and an hydroxylamine, which is stabilized by the presence of a combination of sequestering agents.

2. Description of the Prior Art

The formation of color photographic images by the image-wise coupling of oxidized primary aromatic amino developing agents with color forming or coupling compounds to form indoaniline, indophenol, and azomethine dyes is well known. In these processes, the subtractive process of color formation is ordinarily used and the image dyes customarily formed are cyan, magenta, and yellow, the colors that are complementary to the primary colors, red, green, and blue, respectively. Usually phenol or naphthol couplers are used to form the cyan dye image; pyrazolone or cyanoacetyl derivative couplers are used to form the magenta dye image; and acylacetamide couplers are used to form the yellow dye image.

In these color photographic systems, the color forming coupler may be either in the developer solution or incorporated in the light-sensitive photograhic emulsion layer so that, during development, it is available in the emulsion layer to reach with the color developing agent that is oxidized by silver image development. Diffusible couplers are used in color developer solutions. Nondiffusing couplers are incorporated in photographic emulsion layers. When the dye image formed is to be used in situ, couplers are selected which form non-diffusing dyes. For image transfer color processes, couplers are used which will produce diffusible dyes capable of being mordanted or fixed in the receiving sheet.

In addition to a primary aromatic amino color developing agent, photographic color developing composition frequently contain hydroxylamine or a salt thereof which functions to protect the developing agent against aerial oxidation. They also generally contain a sequestering agent to stabilize the composition against the formation of precipitates and against undesired decomposition reactions, such as the decomposition of the hydroxylamine to generate ammonia. A variety of sequestering agents or combinations of sequestering agents have been proposed in the past for use in stabilizing photographic color developing compositions containing a primary aromatic amino color developing agent and an hydroxylamine. For example, sequestering agents described as being useful for this purpose include the 1,3-diamino-2-propanol tetraacetic acid of U.S. Pat. No. 2,875,049; the diethylenetriamine pentaacetic acid of U.S. Pat. No. 3,462,269; and combination of an aminopolycarboxylic acid and an aromatic polyhydroxy compound of U.S. Pat. No. 3,746,544; the combination of an amino-N,N-dimethylenephosphonic acid and a diphosphonic acid described in Research Disclosure, Volume 134, Item 13410, June 1975; the combination of an hydroxyalkylidene diphosphonic acid and an aminopolycarboxylic acid or of an hydroxyalkylidenediphosphonic acid and an aminopolyphosphonic acid of U.S. Pat. No. 3,994,730; the organic compounds having at least one phosphono group and at least one carboxy group in the molecule described in U.S. Pat. No. 4,083,723; and the combination of an aminophosphonic acid and an aminocarboxylic acid described in Research Disclosure, Volume 170, Item 17048, June 1978. However, in many cases the sequestering agents or sequestering agent combinations proposed in the prior art provide less than satisfactory results in respect to one or both of the aspects of avoiding precipitate formation and avoiding decomposition reactions. This is particularly the case under severe conditions when heavy metals, such as iron, which act to catalyze the decomposition of the hydroxylamine are present in the developer composition in substantial quantities.

It is toward the objective of providing a photographic color developing composition which has excellent stability in respect to both avoiding undesired precipitates and avoiding the harmful effects of decomposition that the present invention is directed.

SUMMARY OF THE INVENTION

In accordance with this invention, it has been discovered that photographic color developing compositions containing a primary aromatic amino color developing agent and an hydroxylamine can be effectively stabilized against both precipitate formation and decomposition reactions by incorporating therein a combination of sequestering agents one of which is an aminopolyphosphonic acid compound and another of which is an aromatic polyhydroxy compound that forms a complex with ferric ion in alkaline solution in which the molar ratio of the ferric ion to the aromatic polyhydroxy compound is 1 to 3. Photographic color developing compositions stabilized in this manner resist the formation of precipitates of calcium, or other metals, and undergo only a slight degree of decomposition of the hydroxylamine under typical conditions of use.

DESCRIPTION OF THE PREFERRED EMBODIMENTS

The primary aromatic amino color developing agents that are utilized in the compositions and methods of this invention are well known and widely used in avariety of color photographic processes. They include aminophenols and p-phenylenediamines. They are usually used in the salt form, such as the hydrochloride or sulfate, as the salt form is more stable than the free amine, and are generally employed in concentrations of from about 0.1 to about 20 grams per liter of developing solution and more preferably from about 0.5 to about 10 grams per liter of developing solution.

Examples of aminophenol developing agents include o-aminophenol, p-aminophenol, 5-amino-2-hydroxytoluene, 2-amino-3-hydroxy-toluene, 2-hydroxy-3-amino-1,4-dimethyl-benzene, and the like.

Particularly useful primary aromatic amino color developing agents are the p-phenylenediamines and especially the N,N-dialkyl-p-phenylenediamines in which the alkyl groups or the aromatic nucleus can be substituted or unsubstituted. Examples of useful p-phenylenediamine color developing agents include:

N,N-diethyl-p-phenylenediamine monohydrochloride,

4-N,N-diethyl-2-methylphenylenediamine monohydrochloride, 4-(N-ethyl-N-2-methanesulfonylaminoethyl)-2-methylphenylenediamine sesquisulfate monohydrate, 4-(N-ethyl-N-2-hydroxyethyl)-2-methylphenylenediamine sulfate, 4-N,N-diethyl-2,2'-methanesulfonylaminoethylphenylenediamine hydrochloride, and the like.

An especially preferred class of p-phenylenediamine developing agents are those containing at least one alkylsulfonamidoalkyl substituent attached to the aromatic nucleus or to an amino nitrogen. Other especially preferred classes of p-phenylenediamines are the 3-alkyl-N-alkyl-N-alkoxyalkyl-p-phenylenediamines and the 3-alkoxy-N-alkyl-N-alkoxyalkyl-p-phenylenediamines. These developing agents are described in U.S. Pat. No. 3,656,950 and 3,658,525, and can be represented by the formula:

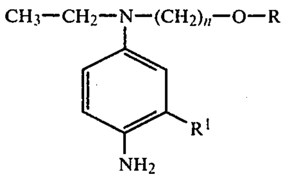

wherein n is an integer having a value of from 2 to 4, R is an alkyl group of from 1 to 4 carbon atoms, and $R^1$ is an alkyl group of from 1 to 4 carbon atoms or an alkoxy group of from 1 to 4 carbon atoms. Illustrative examples of these developing agents include the following compounds:

N-ethyl-N-methoxybutyl-3-methyl-p-phenylenediamine,

N-ethyl-N-ethoxyethyl-3-methyl-p-phenylenediamine,

N-ethyl-N-methoxyethyl-3-n-propyl-p-phenylenediamine,

N-ethyl-N-methoxyethyl-3-methoxy-p-phenylenediamine,

N-ethyl-N-butoxyethyl-3-methyl-p-phenylenediamine, and the like.

In addition to the primary aromatic amino color developing agent, the developing compositions of this invention contain an hydroxylamine. Hydroxylamine can be used in the color developing composition in the form of the free amine, but is more typically employed in the form of a water-soluble acid salt. Typical examples of such salts are sulfates, oxalates, chlorides, phosphates, carbonates, acetates, and the like. The hydroxylamine can be substituted or unsubstituted, for example, the nitrogen atom of the hydroxylamine can be substituted with alkyl radicals. Preferred hydroxylamines are those of the formula:

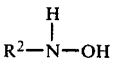

wherein $R^2$ is a hydrogen atom or an alkyl group of 1 to 3 carbon atoms, and water-soluble acid salts thereof.

As described hereinabove, the novel color developer compositions of this invention contain an aromatic polyhydroxy compound that forms a complex with ferric ion in alkaline solution in which the molar ratio of the ferric ion to the aromatic polyhydroxy compound is 1 to 3. Preferably, the aromatic polyhydroxy compound is a compound having at least two hydroxy groups in ortho-position in relation to each other on an aromatic ring. Most preferably, it is a compound which has at least two hydroxy groups in ortho-position in relation to each other on an aromatic carbocyclic ring and which is free of exocyclic unsaturation. Included within the broad class of aromatic polyhydroxy compounds which are useful in this invention are, for example, compounds of the benzene series and of the naphthalene series, which can be represented by the formula:

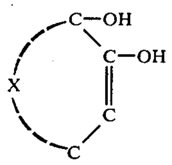

where X represents the carbon atoms necessary to complete the benzene or naphthalene aromatic ring structure. In addition to the hydroxyl substituents, the aromatic ring structure can be substituted with groups such as sulfo radicals, carboxy radicals, or halogen atoms. Typical examples of aromatic polyhydroxy compounds useful in this invention include the following compounds:

pyrocatechol, 4,5-dihydroxy-m-benzene disulfonic acid, 4,5-dihydroxy-m-benzene disulfonic acid disodium salt, tetrabromopyrocatechol, pyrogallol, gallic acid, methyl gallate, propyl gallate, 2,3-dihydroxynaphthalene-6-sulfonic acid, 2,3,8-trihydroxynaphthalene-6-sulfonic acid, and the like.

In addition to the aromatic polyhydroxy compound, the developing compositions of this invention also contain an aminopolyphosphonic acid sequestering agent. The aminopolyphosphonic acid sequestering agent can be utilized in the form of a free acid or in the form of a water-soluble salt. Among the useful aminopolyphosphonic acid sequestering agents are the following:

(1) amino-N,N-dimethylenephosphonic acids of the formula:

$$R^3—N(CH_2PO_3M_2)_2$$

wherein M is a hydrogen atom or a monovalent cation and $R^3$ is an alkyl group, an aryl group, an aralkyl group, an alkaryl group, an alicyclic group or a heterocyclic radical, and $R^3$ can be further substituted with substituents such as hydroxyl, halogen, an alkoxy group, a $—PO_3M_2$ group, a $—CH_2PO_3M_2$ group, or an $—N(CH_2PO_3M_2)_2$ group;

(2) aminodiphosphonic acids of the formula:

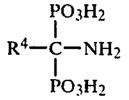

in which $R^4$ is an alkyl group, preferably of one to five carbon atoms, and (3) N-acylaminodiphosphonic acids of the formula:

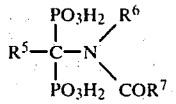

where $R^5$, $R^6$ and $R^7$ are hydrogen or an alkyl group, preferably alkyl of one to five carbon atoms.

Typical examples of the aminopolyphosphonic acid sequestering agents useful in the novel color developing compositions of this invention include:

1-aminoethane-1,1-diphosphonic acid,
1-aminopropane-1,1-diphosphonic acid,
N-acetyl-1-aminoethane-1,1-diphosphonic acid,
ethylenediamine-N,N,N',N'-tetramethylenephosphonic acid,
nitrilo-N,N,N-trimethylenephosphonic acid,
1,2-cyclohexanediamine-N,N,N',N'-tetramethylenephosphonic acid,
o-carboxyanilino-N,N-dimethylenephosphonic acid,
propylamino-N,N-dimethylenephosphonic acid,
4-(N-pyrrolidino)butylamine-N,N-bis(methylenephosphonic acid,
1,3-diaminopropanol-N,N,N',N'-tetramethylenephosphonic acid,
1,3-propanediamine-N,N,N',N'-tetramethylenephosphonic acid,
1,6-hexanediamine-N,N,N',N'-tetramethylenephosphonic acid,
o-acetamidobenzylamino-N,N-dimethylenephosphonic acid,
o-toluidine-N,N-dimethylenephosphonic acid,
2-pyridylamino-N',N'-dimethylenephosphonic acid,
diethylenetriamine pentamethylenephosphonic acid, and the like.

Very effective results are obtained with combinations of:

(1) 4,5-dihydroxy-m-benzene disulfonic acid (or salts thereof) which has the formula:

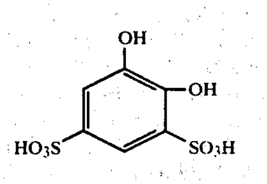

and (2) any one of:

(a) nitrilo-N,N,N-trimethylenephosphonic acid, which has the formula:

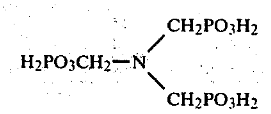

(b) ethylenediamine-N,N,N',N'-tetramethylenephosphonic acid which has the formula:

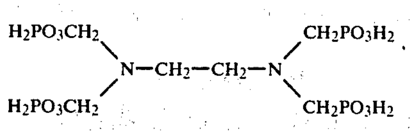

or (c) diethylenetriamine pentamethylenephosphonic acid which has the formula:

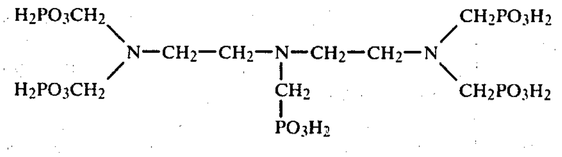

The complexing of metal ions by complexing agents such as the aromatic polyhydroxy compounds and the aminopolyphosphonic acid compounds has been the subject of many theoretical studies. For details of such work, reference is made to the following publications:

G. Schwarzenbach, A. Willi, "Metallindikatoren III. Die Komplexbildung der Benzcatechin-3,5-disulfosäure mit dem Eisen (III)-ion, "*Helv. Chem. Acta,* 34: 528 (1951).

L. F. Loginova, V. V. Medyntsev, & B. I. Khomatov, "Acid-Base Properties of Gallic Acid and the Complex Formation of Gallic Acid and Its Esters with Iron," *Zhurnal Obshchei Kimii,* 42 (4) 739 (1972).

V. A. Nazarenko and E. A. Biryuk, "The Chemistry of the Reactions Between the Ions of Multivalent Elements and Organic Reagents Communication 15. The Reaction Between Iron (III) and Chromotropic and 2,7-dichlorochromotropic Acids," *Zhurnal Analiticheskoi Khimii,* 24, (1), 44 (1969).

H. Stewart Hendrickson, "Comparison of the Metal-Binding Properties of Nitrilotri(methylene phosphonic) Acid and Nitriloacetic Acid: Calcium (II), Nickel (II), Iron (III), and Thorium (IV) Complexes," *Anal. Chem.,* 39: 998 (1967).

L. G. Sillen and A. E. Martell, *Stability Constants of Metal-Ion Complexes, Supplement No.* 1, (London: The Chemistry Society, 1971).

W. A. E. McBryde, "A Spectrophotometric Reexamination of the Spectra and Stabilities of the Iron (III)-Tiron Complexes," *Can. J. Chem.,* 42: 1917 (1964).

The developing compositions of this invention contain an effective amount of both the aminopolyphosphonic acid sequestering agent and the aromatic polyhydroxy compound. Mixtures of two or more aminopolyphosphonic acid sequestering agents and mixtures of two or more aromatic polyhydroxy compounds can, of course, be used if desired. Typically, the aminopolyphosphonic acid sequestering agent is used in larger amounts, on a molar basis, than the aromatic polyhydroxy compound, since the essential function of the aminopolyphosphonic acid is to sequester calcium, while the essential function of the aromatic polyhydroxy compound is to sequester heavy metals such as iron, and these will typically be present in smaller amounts than the calcium. However, both types of sequestering agents are capable of sequestering both calcium and heavy metals to some extent, and the particular amount of each sequestering agent which is optimum will depend upon the particular developer composition involved, and the metal ions which are present therein, and in particular instances either one of the two types of sequestering agents can be used in higher concentration than the other. Generally speaking, the developer solution will contain from about 0.0001 to about 0.1 moles of aminopolyphosphonic acid sequestering agent per liter of solution, more typically from about 0.001 to about 0.05 moles per liter, and preferably from about 0.001 to about 0.01 moles per liter. It will also contain from about 0.00005 to about 0.1 moles of aromatic polyhydroxy compound per liter of solution, more typically from about 0.0002 to about 0.04 moles per liter, and preferably from about 0.0002 to about 0.004 moles per liter.

Applicants are not certain of the mechanisms whereby their invention functions, and do not wish to be bound by any theoretical explanation of these mechanisms. It is, however, well known that the autoxidation and decomposition of hydroxylamine is catalyzed by the presence of heavy metals, such as iron, and that iron is a common contaminant in photographic color developing solutions as a result of contact with materials of construction which contain iron or contamination from processing solutions having very high iron concentrations, such as bleach solutions. In an alkaline color developing solution containing no sequestering agents, iron would precipitate as an insoluble hydrous oxide and the catalytic effect from iron would be minimal. However, color developing solutions require sequestrants, such as the aminopolyphosphonic acid sequestering agents employed herein, to control calcium ion and such sequestrants can form soluble complexes with iron to thereby increase the total iron concentration in the solution and, depending on the characteristics of the complex, adversely affect the stability of hydroxylamine. Applicants believe that in order for an iron-sequestrant complex to act as a catalyst for decomposition of hydroxylamine, it must readily undergo cyclic redox reactions between ferrous and ferric states. If the ferric-sequestrant complex is much more stable than the ferrous-sequestrant complex, the redox properties are altered in such a way that the catalytic effects are minimized. The aromatic polyhydroxy compounds utilized in the present invention are compounds which form a complex with ferric ion in alkaline solution in which the molar ratio of the ferric ion to the aromatic polyhydroxy compound is 1 to 3. This type of complex is very strong, that is, it has a very high stability constant. By forming very strong complexes with iron in the ferric state, the aromatic polyhydroxy compounds utilized in this invention are believed to render the iron ineffective as a redox catalyst and thereby achieve the desired result of protecting the hydroxylamine against decomposition.

Optional ingredients which can be included in the color developing compositions of this invention include alkalies to control pH, thiocyanates, bromides, chlorides, iodides, benzyl alcohol, sulfites, thickening agents, solubilizing agents, brightening agents, wetting agents, stain reducing agents, and so forth. The pH of the developing solution is ordinarily above 7 and most typically about 10 to about 13.

The hydroxylamine is preferably included in the color developing composition in an amount of from about 1 to about 8 moles per mole of primary aromatic amino color developing agent, more preferably in an amount of from about 2 to about 7 moles per mole, and most preferably in an amount of from about 3 to about 5 moles per mole.

Development of photographic elements in the color developing compositions described herein can be advantageously employed in the processing of photographic elements designed for reversal color processing or in the processing of negative color elements or color print materials. The novel combination of sequestering agents described herein can be employed with photograhic elements which are processed in color developers containing couplers or with photograhic elements which contain the coupler in the silver halide emulsion layers or in layers contiguous thereto. The photosensitive layers present in the photographic elements processed according to the method of this invention can contain any of the conventional silver halides as the photosensitive material, for example, silver chloride, silver bromide, silver bromoiodide, silver chlorobromide, silver chloroiodide, silver chlorobromoiodide, and mixtures thereof. These layers can contain conventional addenda and be coated on any of the photographic supports, such as, for example, cellulose nitrate film, cellulose acetate film, polyvinyl acetal film, polycarbonate film, polystyrene film, polyethylene terephthalate film, paper, polymer-coated paper, and the like.

The invention is further illustrated by the following examples of its practice.

EXAMPLE 1

An aqueous alkaline photographic color developer solution was prepared using as the primary aromatic amino color developing agent the compound 4-(N-ethyl-N-2-methanesulfonylaminoethyl)-2-methyl-phenylenediamine sesquisulfate monohydrate in a concentration of 4.2 grams per liter. Hydroxylamine sulfate was included in the solution at a concentration of 4.1 grams per liter and the solution also contained benzyl alcohol, potassium carbonate, potassium sulfite, potassium bromide, potassium chloride, potassium hydroxide, a wetting agent and a stain reducing agent. Ferric chloride was added to the solution in an amount sufficient to provide a concentration of ferric ions of 2.0 milligrams per liter. Sequestering agents were incorporated in samples of the developer solution as described in Table I below and the samples were stored in open one-liter graduated cyclinders maintained at a temperature of 38° C. in a water bath. Distilled water was added to the samples to account for evaporation. Periodically, the samples were analyzed to determine the content of hydroxylamine sulfate. Results obtained are reported in Table I, which specifies the initial rate of hydroxylamine sulfate decomposition measured in grams lost per day. As indicated by the data in Table I, use of a combination of ethylenediamine-N,N,N',N'-tetramethylenephosphonic acid and 4,5-dihydroxy-m-benzene disulfonic acid disodium salt results in a much lower rate of decomposition of hydroxylamine sulfate than use of ethylenediamine-N,N,N',N'-tetramethylenephosphonic acid by itself. The combination was also found to be highly effective in avoiding precipitate formation.

TABLE I

| Sample No. | Concentration of Sequestering Agent A[1] (grams/liter) | Concentration of Sequestering Agent B[2] (grams/liter) | Initial Rate of Decomposition of Hydroxylamine Sulfate (grams/day) |
|---|---|---|---|
| 1 | 1.5 | 0 | 0.134 |
| 2 | 1.5 | 0.05 | 0.126 |
| 3 | 1.5 | 0.10 | 0.095 |
| 4 | 1.5 | 0.30 | 0.072 |

(1) Sequestering Agent A is ethylenediamine-N,N,N',N'-tetramethylenephosphonic acid.
(2) Sequestering Agent B is 4,5-dihydroxy-m-benzene disulfonic acid disodium salt.

EXAMPLE 2

Sequestering agents were incorporated in samples of the developer solution described in Example 1 in concentrations indicated in Table II below, and the samples were stored and tested for decomposition of hydroxylamine sulfate in the same manner as described in Example 1. As indicated by the data in Table II, use of a combination of diethylenetriamine pentamethylenephosphonic acid and 4,5-dihydroxy-m-benzene disulfonic acid disodium salt results in a much lower rate of decomposition of hydroxylamine sulfate than use of diethylenetriamine pentamethylenephosphonic acid by itself. The combination was also found to be highly effective in avoiding precipitate formation.

For purposes of comparison, three samples of the developer solution were prepared using the sequestering agent 1-hydroxyethylidene-1,1-diphosphonic acid in place of an aminopolyphosphonic acid sequestering agent. The first sample contained 0.67 grams/liter of 1-hydroxyethylidene-1,1-diphosphonic acid, the second contained 0.67 grams/liter of 1-hydroxyethylidene-1,1-diphosphonic acid and 0.10 grams/liter of 4,5-dihydroxy-m-benzene disulfonic acid disodium salt, and the third contained 0.67 grams/liter of 1-hydroxyethylidene-1,1-diphosphonic acid and 0.30 grams/liter of 4,5-dihydroxy-m-benzene disulfonic acid disodium salt. Values obtained for the initial rate of hydroxylamine sulfate decomposition in grams per day were 0.067, 0.065 and 0.069, respectively. As shown by these data, while the aromatic polyhydroxy compounds utilized in the developing compositions of this invention have a major effect on hydroxylamine decomposition when used in combination with aminopolyphosphonic acid sequestering agents, they have little or no effect when used in combination with hydroxypolyphosphonic acid sequestering agents such as 1-hydroxyethylidene-1,1-diphosphonic acid.

TABLE II

| Sample No. | Concentration of Sequestering Agent C[(1)] (grams/liter) | Concentration of Sequestering Agent B[(2)] (grams/liter) | Initial Rate of Decomposition of Hydroxylamine Sulfate (grams/day) |
|---|---|---|---|
| 5 | 1.95 | 0 | 0.141 |
| 6 | 1.95 | 0.05 | 0.122 |
| 7 | 1.95 | 0.10 | 0.086 |
| 8 | 1.95 | 0.30 | 0.071 |

[(1)]Sequestering Agent C is diethylenetriamine pentamethylenephosphonic acid.
[(2)]Sequestering Agent B is 4,5-dihydroxy-m-benzene disulfonic acid disodium salt.

EXAMPLE 3

Sequestering agents were incorporated in samples of the developer solution described in Example 1 in concentrations indicated in Table III below and the samples were stored and tested for decomposition of hydroxylamine sulfate in the same manner as described in Example 1. As indicated by the data in Table III, use of a combination of nitrilo-N,N,N-trimethylenephosphonic acid pentasodium salt and 4,5-dihydroxy-m-benzene disulfonic acid disodium salt resulted in a much lower rate of decomposition of hydroxylamine sulfate then use of nitrilo-N,N,N-trimethylenephosphonic acid pentasodium salt by itself. The combination was also found to be highly effective in avoiding precipitate formation.

TABLE III

| Sample No. | Concentration of Sequestering Agent D[(1)] (grams/liter) | Concentration of Sequestering Agent B[(2)] (grams/liter) | Initial Rate of Decomposition of Hydroxylamine Sulfate (grams/day) |
|---|---|---|---|
| 9 | 1.04 | 0 | 0.644 |
| 10 | 1.04 | 0.30 | 0.068 |

TABLE III-continued

[(1)]Sequestering Agent D is nitrilo-N,N,N-trimethylenephosphonic acid pentasodium salt.
[(2)]Sequestering Agent B is 4,5-dihydroxy-m-benzene disulfonic acid disodium salt.

EXAMPLE 4

Sequestering agents were incorporated in samples of the developer solution described in Example 1 in concentrations indicated in Table IV below, and the samples were stored and tested for decomposition of hydroxylamine sulfate in the same manner as described in Example 1. In each case, the developer solution contained 1.04 grams of nitrilo-N,N,N-trimethylenephosphonic acid pentasodium salt in addition to the sequestering agent identified in Table IV. Comparing the data in Tables III and IV, it is seen that 4,5-dihydroxy-m-benzene disulfonic acid disodium salt, pyrogallol, propyl gallate, gallic acid, and methyl gallate are effective in reducing the rate of decomposition of hydroxylamine sulfate while tetrahydroxy-p-benzoquinone, 2,3-quinoxalinediol and chromotropic acid are not. In particular, it is seen that the rate of 0.644 grams/day obtained in using nitrilo-N,N,N-trimethylenephosphonic acid pentasodium salt by itself was reduced to rates ranging from 0.28 grams/day for gallic acid to 0.068 grams/day for 4,5-dihydroxy-m-benzene disulfonic acid disodium salt, whereas tetrahydroxy-p-benzoquinone brought about only a slight reduction in rate to 0.60 grams/day, and both 2,3-quinoxalinediol and chromotropic acid brought about slight increases in the rate of decomposition.

TABLE IV

| Sample No. | Sequestering Agent | Concentration of Sequestering Agent (grams/liter) | Initial Rate of Decomposition of Hydroxylamine Sulfate (grams/day) |
|---|---|---|---|
| 11 | Pyrogallol | 0.30 | 0.26 |
| 12 | Tetrahydroxy-p-benzoquinone | 0.30 | 0.60 |
| 13 | Propyl Gallate | 0.30 | 0.13 |
| 14 | Gallic Acid | 0.30 | 0.28 |
| 15 | Methyl Gallate | 0.30 | 0.21 |
| 16 | 2,3-quinoxalinediol | 0.30 | 0.70 |
| 17 | Chromotropic Acid | 0.30 | 0.69 |

The results shown in Tables III and IV can be explained in terms of structural differences in the aromatic polyhydroxy compounds utilized, and resulting differences in the ability of the compounds to complex with ferric ion. These compounds have structural formulas as follows:

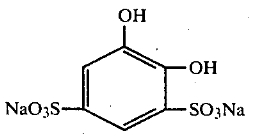

4,5-dihydroxy-m-benzene disulfonic acid disodium salt.

-continued

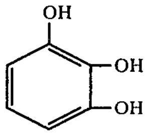
pyrogallol

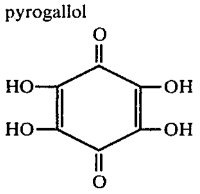
tetrahydroxy-p-benzoquinone

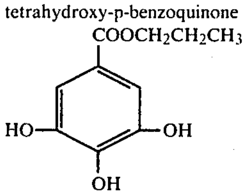
propyl gallate

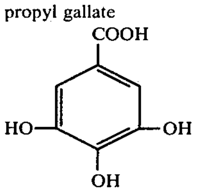
gallic acid

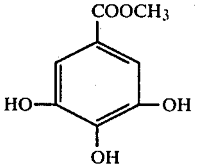
methyl gallate

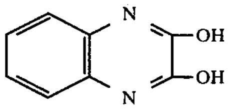
2,3-quinoxalinediol

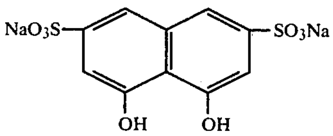
chromotropic acid

Each of 4,5-dihydroxy-m-benzene disulfonic acid disodium salt, pyrogallol, propyl gallate, gallic acid, and methyl gallate formed, in alkaline solution, a strong bright-red complex with ferric ion in which the molar ratio of the ferric ion to the aromatic polyhydroxy compound is 1 to 3, whereas tetrahydroxy-p-benzoquinone, 2,3-quinoxalinediol and chromotropic acid did not form this type of complex. Considering the structures of the compounds shown above, it is noted that each of 4,5-dihydroxy-m-benzene disulfonic acid disodium salt, pyrogallol, propyl gallate, gallic acid and methyl gallate falls within the class of aromatic polyhydroxy compounds which have at least two hydroxy groups in ortho-position in relation to each other on an aromatic carbocyclic ring, and which is free of exocyclic unsaturation. On the other hand, while tetrahydroxy-p-benzoquinone, 2,3-quinoxalinediol and chromotropic acid are aromatic polyhydroxy compounds, they do not fall within this class, and are not effective for the purposes of the present invention.

As shown by the above examples, the combination of a sequestering agent from each of the classes described herein is highly effective in providing a developing solution with a low rate of decomposition of the hydroxylamine. For example, comparison of the data for samples 9 and 10 indicates that use of a combination of nitrilo-N,N,N-trimethylenephosphonic acid pentasodium salt and 4,5-dihydroxy-m-benzene disulfonic acid disodium salt gave a rate of decomposition that was only about one tenth as great as that obtained when nitrilo-N,N,N-trimethylenephosphonic acid pentasodium salt was used by itself. This is a very important consideration, since a high rate of decomposition of hydroxylamine means that the color developing solution has poor stability, with resulting inadequate resistance to aerial oxidation, and since decomposition of hydroxylamine can result in decomposition products, such as ammonia, that have adverse sensitometric effects. The combination of a sequestering agent from each of the classes described herein is also highly effective in avoiding precipitation problems. The aminopolyphosphonic acid sequestering agents are excellent sequestering agents for calcium, and thus are very effective in control of water hardness. Because of its excellent ability in controlling water hardness, the compound nitrilo-N,N,N-trimethylenephosphonic acid has enjoyed widespread use in photographic processing solutions, including color developing solutions, but it has not previously been useful in color developing solutions containing hydroxylamines. The present invention enables it to be used in such color developing solutions to achieve the benefits of both excellent control of water hardness, and excellent hydroxylamine stability.

Although the invention has been described with particular reference to preferred embodiments thereof, it will be readily understood that variations and modifications can be effected within the spirit and scope of the invention as described hereinabove and as defined in the appended claims.

We claim:

1. A photographic color developing composition comprising:

(1) a primary aromatic amino color developing agent, (2) an hydroxylamine, and (3) a combination of sequestering agents, one of which is an aminopolyphosphonic acid compound and another of which is an aromatic polyhydroxy compound that forms a complex with ferric ion in alkaline solution in which the molar ratio of the ferric ion to the aromatic polyhydroxy compound is 1 to 3, said aromatic polyhydroxy compound having at least two hydroxy groups in ortho-position in relation to each other on an aromatic carbocyclic ring and being free of exocyclic unsaturation.

2. A photographic color developing composition as claimed in claim 1 wherein said primary aromatic amino color developing agent is a p-phenylenediamine.

3. A photographic color developing composition as claimed in claim 1 wherein said primary aromatic amino color developing agent is an aminophenol.

4. A photographic color developing composition as claimed in claim 1 wherein said primary aromatic amino color developing agent is 4-(N-ethyl-N-2-methanesulfonylaminoethyl)-2-methylphenylenediamine sesquisulfate monohydrate.

5. A photographic color developing composition as claimed in claim 1 wherein said hydroxylamine is hydroxylamine sulfate.

6. A photographic color developing composition as claimed in claim 1 wherein said combination of sequestering agents comprises ethylenediamine-N,N,N',N'-tetramethylenephosphonic acid and 4,5-dihydroxy-m-benzene disulonic acid.

7. A photographic color developing composition as claimed in claim 1 wherein said combination of sequestering agents comprises diethylenetriamine pentamethylenephosphonic acid and 4,5-dihydroxy-m-benzene disulfonic acid.

8. A photographic color developing composition as claimed in claim 1 wherein said combination of sequestering agents comprises nitrilo-N,N,N-trimethylenephosphonic acid and 4,5-dihydroxy-m-benzene disulfonic acid.

9. A photographic color developing composition comprising:

(1) a primary aromatic amino color developing agent,
(2) an hydroxylamine, and
(3) a combination of sequestering agents, one of which is an aminopolyphosphonic acid compound selected from the group consisting of:
(a) amino-N,N-dimethylenephosphonic acids of the formula:

$R^3—N(CH_2PO_3M_2)_2$ wherein M is a hydrogen atom or a monovalent cation and $R^3$ is an alkyl group, an aryl group, an aralkyl group, an alkaryl group, an alicyclic group, or a heterocyclic radical, (b) aminodiphosphonic acids of the formula:

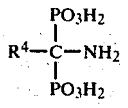

wherein $R^4$ is an alkyl group, and (c) N-acyl aminodiphosphonic acids of the formula:

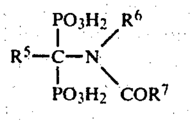

wherein each of $R^5$, $R^6$ and $R^7$ is a hydrogen atom or an alkyl group, and another of which is an aromatic polyhydroxy compound of the formula:

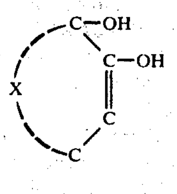

wherein X represents the carbon atoms necessary to complete a benzene or naphthalene aromatic ring structure.

10. A photographic color developing composition comprising:

(1) a primary aromatic amino color developing agent,
(2) an hydroxylamine, and
(3) a combination of sequestering agents, one of which is an aminopolyphosphonic acid compound selected from the group consisting of nitrilo-N,N,N-trimethylenephosphonic acid, ethylenediamine-N,N,N',N'-tetramethylenephosphonic acid, and diethylenetriamine pentamethylenephosphonic acid, and another of which is an aromatic polyhydroxy compound selected from the group consisting of
4,5-dihydroxy-m-benzene disulfonic acid disodium salt, pyrogallol, propyl gallate, gallic acid and methyl gallate.

11. A photographic color developing composition comprising:

(1) 4-(N-ethyl-N-2-methanesulfonylaminoethyl)-2-methylphenylenediamine sesquisulfate monohydrate,
(2) hydroxylamine sulfate,
(3) nitrilo-N,N,N-trimethylenephosphonic acid pentasodium salt, and
(4) 4,5-dihydroxy-m-benzene disulfonic acid disodium salt.

12. A process of color developing an imagewise-exposed photographic element which comprises contacting said element with a color developing composition comprising:

(1) a primary aromatic amino color developing agent,
(2) an hydroxylamine, and
(3) a combination of sequestering agents, one of which is an aminopolyphosphonic acid compound and another of which is an aromatic polyhydroxy compound that forms a complex with ferric ion in alkaline solution in which the molar ratio of the ferric ion to the aromatic polyhydroxy compound is 1 to 3, said aromatic polyhydroxy compound having at least two hydroxy groups in ortho-position in relation to each other on an aromatic carboxylic ring and being free of exocyclic unsaturation.

13. A process as claimed in claim 12 wherein said primary aromatic amino color developing agent is a p-phenylenediamine.

14. A process as claimed in claim 12 wherein said primary aromatic amino color developing agent is an aminophenol.

15. A process as claimed in claim 12 wherein said primary aromatic amino color developing agent is 4-(N-ethyl-N-2-methane-sulfonylaminoethyl)-2-methyl-phenylenediamine sesquisulfate monohydrate.

16. A process as claimed in claim 12 wherein said hydroxylamine is hydroxylamine sulfate.

17. A process as claimed in claim 12 wherein said combination of sequestering agents comprises ethylenediamine-N,N,N',N'-tetramethylenephosphonic acid and 4,5-dihydroxy-m-benzene disulfonic acid.

18. A process as claimed in claim 12 wherein said combination of sequestering agents comprises diethylenetriamine pentamethylenephosphonic acid and 4,5-dihydroxy-m-benzene disulfonic acid.

19. A process as claimed in claim 12 wherein said combination of sequestering agents comprises nitrilo-N,N,N-trimethylenephosphonic acid and 4,5-dihydroxy-m-benzene disulfonic acid.

20. A process of color developing an imagewise-exposed photographic element which comprises contacting said element with a color developing composition comprising:

(1) a primary aromatic amino color developing agent,
(2) an hydroxylamine, and
(3) a combination of sequestering agents, one of which is an aminopolyphosphonic acid compound selected from the group consisting of:
(a) amino-N,N-dimethylenephosphonic acids of the formula:

$$R^3—N(CH_2PO_3M_2)_2$$

wherein M is a hydrogen atom or a monovalent cation and $R^3$ is an alkyl group, an aryl group, an aralkyl group, an alkaryl group, an alicyclic group or a heterocyclic radical,
(b) aminodiphosphonic acids of the formula:

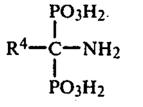

wherein $R^4$ is an alkyl group, and
(c) N-acyl aminodiphosphonic acids of the formula:

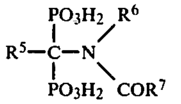

wherein each of $R^5$, $R^6$ and $R^7$ is a hydrogen atom or an alkyl group, and another of which is an aromatic polyhydroxy compound of the formula:

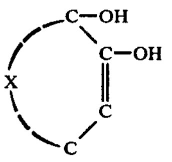

wherein X represents the carbon atoms necessary to complete a benzene or naphthalene aromatic ring structure.

21. A process of color developing an imagewise-exposed photographic element which comprises contacting said element with a color developing composition comprising:
(1) a primary aromatic amino color developing agent,
(2) an hydroxylamine, and
(3) a combination of sequestering agents, one of which is an aminopolyphosphonic acid compound selected from the group consisting of nitrilo-N,N,N-trimethylenephosphonic acid, ethylenediamine-N,N,N-tetramethylenephosphonic acid, and diethylenetriamine pentamethylenephosphonic acid, and another of which is an aromatic polyhydroxy compound selected from the group consisting of 4,5-dihydroxy-m-benzene disulfonic acid disodium salt, pyrogallol, propyl gallate, gallic acid and methyl gallate.

22. A process of color developing an imagewise-exposed photographic element which comprises contacting said element with a color developing composition comprising:
(1) 4-(N-ethyl-N-2-methanesulfonylaminoethyl)-2-methylphenylenediamine sesquisulfate monohydrate,
(2) hydroxylamine sulfate,
(3) nitrilo-N,N,N-trimethylenephosphonic acid pentasodium salt, and
(4) 4,5-dihydroxy-m-benzene disulfonic acid disodium salt.

23. A method of stabilizing a photographic color developing composition comprising a primary aromatic amino color developing agent and an hydroxylamine, which method comprises incorporating in said composition a combination of sequestering agents, one of which is an aminopolyphosphonic acid compound and another of which is an aromatic polyhydroxy compound that forms a complex with ferric ion in alkaline solution in which the molar ratio of the ferric ion to the aromatic polyhydroxy compound is 1 to 3, said aromatic polyhydroxy compound having at least two hydroxy groups in ortho-position in relation to each other on an aromatic carbocyclic ring and being free of exocyclic unsaturation.

24. A method as claimed in claim 23 wherein said combination of sequestering agents comprises ethylenediamine-N,N,N',N'-tetramethylenephosphonic acid and 4,5-dihydroxy-m-benzene disulfonic acid.

25. A method as claimed in claim 23 wherein said combination of sequestering agents comprises diethylenetriamine pentamethylenephosphonic acid and 4,5-dihydroxy-m-benzene disulfonic acid.

26. A method as claimed in claim 23 wherein said combination of sequestering agents comprises nitrilo-N,N,N-trimethylenephosphonic acid and 4,5-dihydroxy-m-benzene disulfonic acid.

27. A sequestering composition adapted for use in a photographic color developing composition comprising a primary aromatic amino color developing agent and an hydroxylamine, said sequestering composition comprising a combination of sequestering agents, one of which is an aminopolyphosphonic acid compound and another of which is an aromatic polyhydroxy compound that forms a complex with ferric ion in alkaline solution in which the molar ratio of the ferric ion to the aromatic polyhydroxy compound is 1 to 3, said aromatic polyhydroxy compound having at least two hydroxy groups in ortho-position in relation to each other on an aromatic carbocyclic ring and being free of exocyclic unsaturation.

28. A composition as claimed in claim 27 wherein said combination of sequestering agents comprises ethylenediamine-N,N,N',N'-tetramethylenephosphonic acid and 4,5-dihydroxy-m-benzene disulfonic acid.

29. A composition as claimed in claim 27 wherein said combination of sequestering agents comprises diethylenetriamine pentamethylenephosphonic acid and 4,5-dihydroxy-m-benzene disulfonic acid.

30. A composition as claimed in claim 27 wherein said combination of sequestering agents comprises nitrilo-N,N,N-trimethylenephosphonic acid and 4,5-dihydroxy-m-benzene disulfonic acid.

* * * * *